(12) United States Patent
Gruhlke

(10) Patent No.: US 9,921,408 B2
(45) Date of Patent: Mar. 20, 2018

(54) COLLIMATING LIGHT EMITTED BY A FIBER VIA AN ARRAY OF LENSLETS ON A CURVED SURFACE

(71) Applicant: QUALCOMM Incorporated, San Diego, CA (US)

(72) Inventor: Russell Gruhlke, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/359,461

(22) Filed: Nov. 22, 2016

(65) Prior Publication Data

US 2017/0248783 A1    Aug. 31, 2017

Related U.S. Application Data

(60) Provisional application No. 62/300,690, filed on Feb. 26, 2016.

(51) Int. Cl.
*G02B 26/10* (2006.01)
*G02B 3/00* (2006.01)
(Continued)

(52) U.S. Cl.
CPC .......... *G02B 26/103* (2013.01); *G01S 7/4817* (2013.01); *G01S 7/4818* (2013.01); *G02B 3/0037* (2013.01); *G02B 2006/0098* (2013.01)

(58) Field of Classification Search
CPC ................ G02B 26/103; G02B 3/0037; G02B 2006/0098; G01S 7/4818; G01S 7/4817
See application file for complete search history.

(56) References Cited

U.S. PATENT DOCUMENTS 5,612,821 A    3/1997  Schmutz
6,587,618 B2   7/2003  Raguin et al.
(Continued)

FOREIGN PATENT DOCUMENTS

WO    2010055454 A1    5/2010
WO    2015152705 A1    10/2015

OTHER PUBLICATIONS

Computer generated English translation of WO 2015/152705 A1.*
International Search Report and Written Opinion—PCT/US2017/014541—ISA/EPO—dated May 4, 2017.

*Primary Examiner* — John M Bedtelyon
(74) *Attorney, Agent, or Firm* — Muncy, Geissler, Olds & Lowe, P.C./QUALCOMM

(57) ABSTRACT

An embodiment is directed to an optical element arrangement including at least one optical element. A first optical element includes a fiber and a curved surface. The fiber emits light beams during oscillation at different angular positions relative to a system axis of the first optical element. The curved surface includes an array of lenslets. Each of the lenslets in the array of lenslets is configured to receive light beams from the fiber that are emitted within a particular range of the first curved surface and to collimate the light beams received by the lenslet at a lenslet-specific field angle relative to the system axis. In other embodiments, one or more additional optical elements with respective fibers can be deployed as part of the optical element arrangement, and any of the optical elements in the optical element arrangement may include multiple curved surfaces with respective lenslet arrays.

30 Claims, 11 Drawing Sheets

(51) Int. Cl.
  *G01S 7/481* (2006.01)
  *G02B 6/00* (2006.01)

(56) References Cited

U.S. PATENT DOCUMENTS

| | | |
|---|---|---|
| 6,980,717 B2 | 12/2005 | Watanabe et al. |
| 7,734,128 B2 | 6/2010 | Takeuchi |
| 9,091,817 B2 | 7/2015 | Wagener et al. |
| 9,234,964 B2 * | 1/2016 | Mheen .................... G01S 17/89 |
| 9,500,809 B2 * | 11/2016 | Popp ..................... G02B 6/322 |
| 9,574,735 B2 * | 2/2017 | Benitez ..................... F21V 5/04 |
| 2003/0231829 A1 | 12/2003 | Meyers et al. |

\* cited by examiner

COLLIMATING LIGHT EMITTED BY A FIBER VIA AN ARRAY OF LENSLETS ON A CURVED SURFACE

CROSS-REFERENCE TO RELATED APPLICATIONS

The present application for patent claims the benefit of U.S. Provisional Application No. 62/300,690, entitled "FIBER BASED LIDAR AND COLLIMATING OPTICS SYSTEM", filed Feb. 26, 2016, which is by the same inventors as the subject application, assigned to the assignee hereof and hereby expressly incorporated by reference herein in its entirety.

BACKGROUND

1. Field of the Disclosure

Embodiments relate to collimating light emitted by a fiber via an array of lenslets on a curved surface.

2. Description of the Related Art

Some object detection systems (e.g., collimating optical systems such as the Hyperion lidar project) rely upon the emission of a scanning optical probe beam by a scanning device. When this probe beam strikes an object within a threshold distance (e.g., 100 m) from the fiber that emits the scanning optical probe beam away), light is scattered from the object back to a receiver unit at the scanning device that records the presence of the object and calculates the object's x,y,z position, whereby x and y are determined based on an emission direction of the scanning optical probe beam and z via time of flight technology (e.g., based on a propagation speed of the scanning optical probe beam along with a time differential between emission of the scanning optical probe beam and detection of the scattered light detected at the receiver unit).

FIG. 1 illustrates an example of an object detection system 100. Referring to FIG. 1, a scanning device 105 includes a fiber 110 and a receiver unit 115. The fiber 110 emits a scanning optical probe beam 120, which makes contact with a car 125 that is within a threshold distance (e.g., 100 m). When the scanning optical probe beam 120 contacts the car 125, the scanning optical probe beam 120 is scattered in numerous directions as depicted with respect to scattered light beams 130-155. Some of the scattered light beams (e.g., scattered light beam 145) reach and are detect by the receiver unit 115 at the scanning device 105, after which the scanning device 105 can calculate the x,y,z position of the car 125.

Achieving desired scanning optical probe beam properties is challenging for various reasons. For example, a scanning optical probe beam should range over a wide field of view (FOV) with little divergence; i.e. a high degree of collimation. An example FOV requirement for an object detection system is +/−60 degrees with a beam divergence of 0.1 degree over the entire FOV. Furthermore, the lens system producing this collimation may be configured with a small format (~10×10×10 mm).

FIG. 2 illustrates an arrangement of the fiber 110 within the scanning device 105 in more detail. With respect to FIG. 2, the fiber 110, which is a single or multi-mode optical fiber, is the light source of the scanning device 105. More specifically, the light source is the end of the fiber 110 into which light has been injected. To vary the angular direction of the fiber 110, a piezoelectric cylinder 200 rotates/vibrates the fiber 110 (running through a center of the piezoelectric cylinder), through a wide variety of angles. Exciting the cantilever (i.e., the fiber 100) with resonant frequency via the piezoelectric cylinder 200 will induce oscillations at the tip of the cantilever with an amplitude that is 100-200 times of the base of the cantilever. An example of the fiber 110 (or cantilever) in motion is depicted with respect to 205, whereby the fiber 110 is being vibrated resulting in angular rotation of +/−45 degrees in orthogonal planes, resulting in scanning optical probe beam 210. More specifically, the scanning optical probe beam 210 illustrates a view of the light emitted from the fiber 110 from in front of the fiber 110, or alternatively a few of the light that is beamed onto the target object (e.g., the car 125), which is then scattered. This fiber tip path is approximately spherical for small angular motion, but becomes elliptical for larger angular motions as the fiber 110 begins to bend, which complicates the design of a collimating optical system.

Light refracted through a lens system at large angles (e.g., with respect to an optical axis or lens axis of symmetry) is typically subject to larger aberrations relative to light that is refracted through smaller angles. This means that the degree of collimation is reduced for light propagating at the larger angles. Typically, beam divergence increases 3× to 10× times at the largest field angles (e.g., 30 degrees, 60 degrees, etc.). This tendency is exaggerated for a lidar system where the fiber tip source is not constrained to travel in a plane but rather travels on a spherical or elliptical surface.

SUMMARY

An embodiment is directed to an optical element arrangement including a first optical element. The first optical element includes a first fiber configured to emit light beams during oscillation at different angular positions relative to a first system axis of the first optical element, and a first curved surface including a first array of lenslets, each of the lenslets in the first array of lenslets configured to receive light beams from the first fiber that are emitted within a particular range of the first curved surface and to collimate the light beams received by the lenslet at a lenslet-specific field angle relative to the first system axis.

An embodiment is directed to a method of operating an optical element arrangement, including emitting, by a first fiber of a first optical element, light beams during oscillation at different angular positions relative to a first system axis of the first optical element receiving, by a first curved surface of the first optical element, the emitted light beams from the first fiber, the first curved surface including a first array of lenslets that each receive a portion of the emitted light beams from the first fiber within a particular range of the first curved surface and collimating, by each of the lenslets in the first array of lenslets, the portion of the emitted light beams received at the first curved surface from the first fiber at a lenslet-specific field angle relative to the first system axis.

An embodiment is directed to an optical element arrangement including a first optical element. The first optical element includes a first means for emitting light beams during oscillation at different angular positions relative to a first system axis of the first optical element, and a first means for receiving light beams from the first means for emitting that are emitted within a first set of ranges of the first means for receiving, the first means for receiving including a first array of means for collimating the light beams received by the first means for receiving, each of the first array of means for collimating configured to collimate the light beams within a particular range from the first set of ranges at a field angle relative to the first system axis that is specific to the means for collimating.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Embodiments relate to an optical element in a fiber-based lidar system that collimates light over large field angles in a manner that is angle independent. The embodiments below are described with respect to a refractive optical element, but alternative implementations could incorporate diffractive and/or holographic optical elements (e.g., if the optical element is configured as monochromatic).

Figure 2:
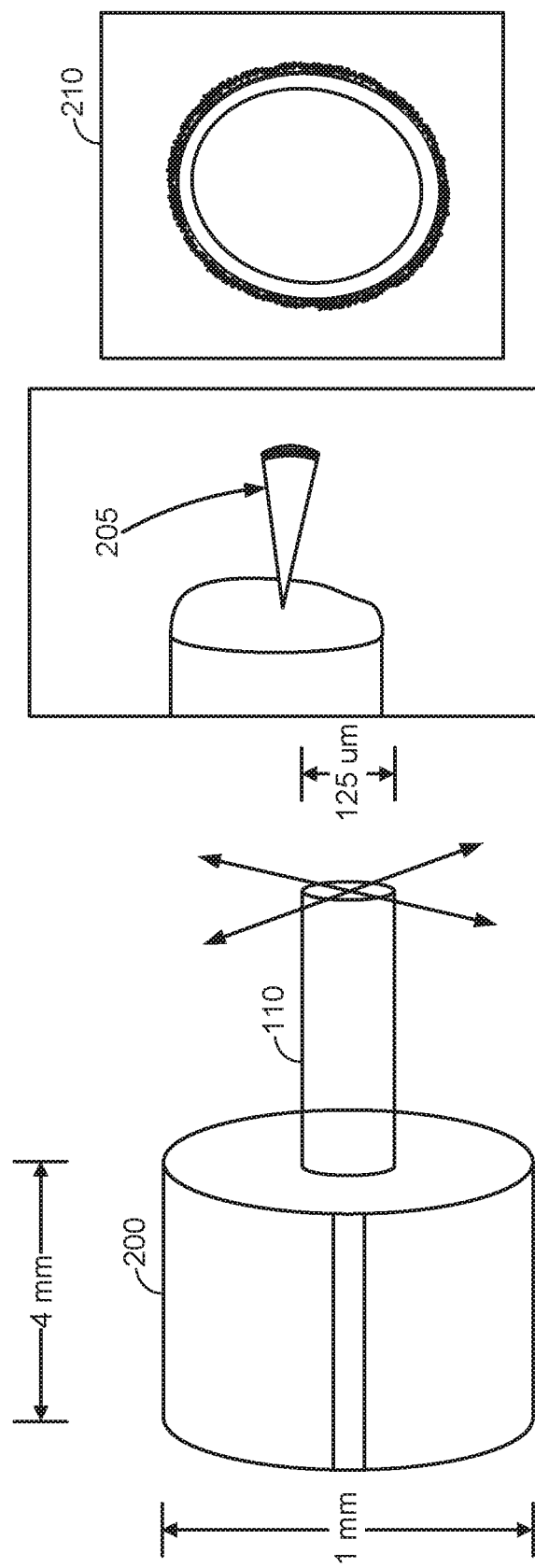
FIG. 2 illustrates an arrangement of a fiber within a scanning device.
Figure 3:
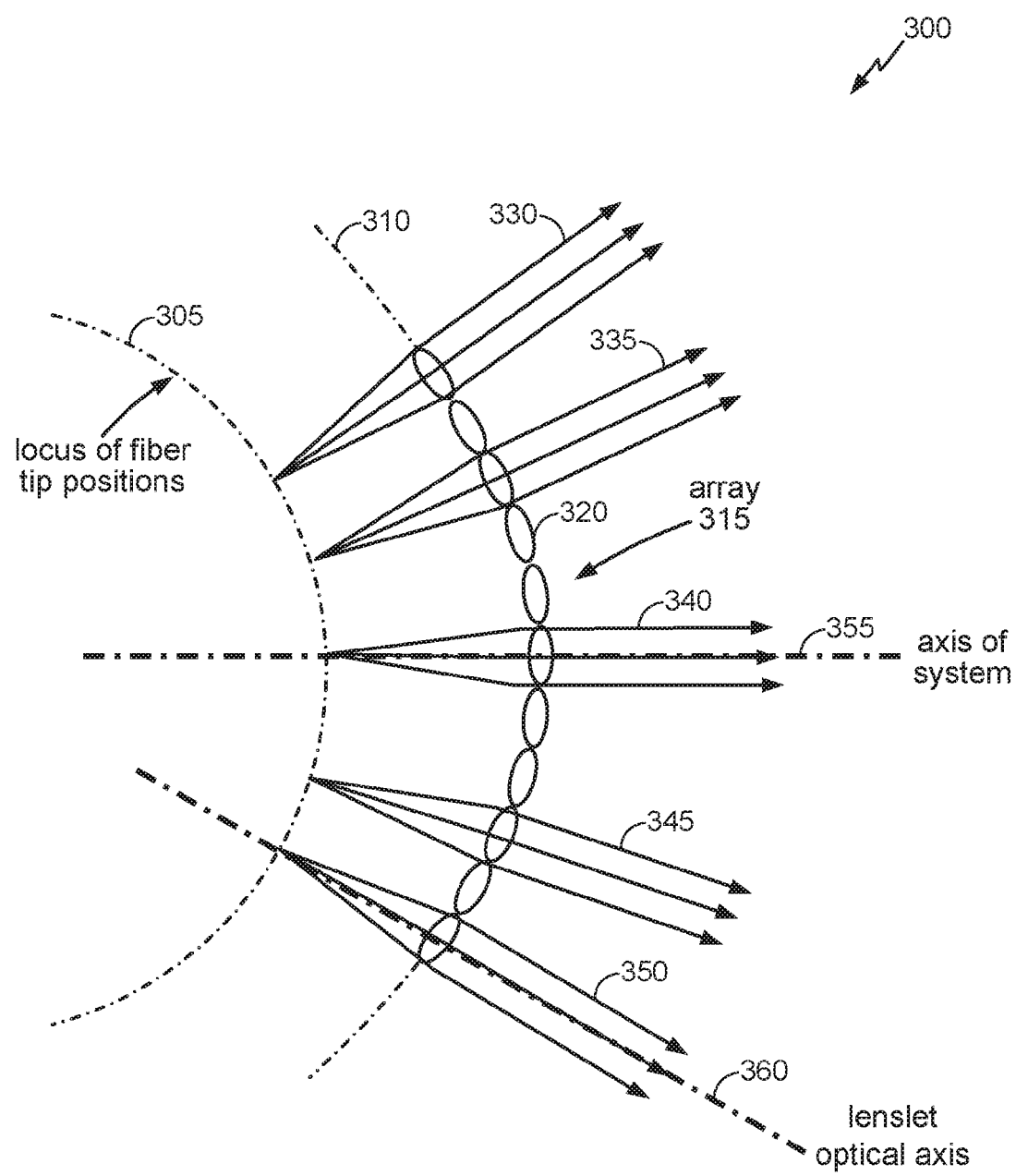
FIG. 3 illustrates an optical element in accordance with an embodiment of the disclosure.

FIG. 3 illustrates an optical element 300 in accordance with an embodiment of the disclosure. Referring to FIG. 3, the actual fiber is not illustrated explicitly, but a locus of fiber tip positions is depicted with respect to 305. In an example, the locus 305 corresponds to the position of the fiber tip while the fiber is oscillated by the piezoelectric cylinder 200 described above with respect to FIG. 2. The fiber of the optical element 300 projects or emits light onto a curved surface (e.g., a spherical surface) of the optical element 300. Instead of the curved surface 310 of the optical element 300 being smooth, the curved surface 310 includes an array 315 of lenslets 320. In an example, the lenslets 320 may be shaped hemispherically, aspherically (e.g., elliptically, etc.) or some combination thereof. In an example, each lenslet 320 may be implemented as a refractive hemispherical or aspherical "bump" that functions to bend light so that any light beam projected from the fiber onto the lenslet is collimated (e.g., made substantially parallel with each other). However, in other embodiments, the lenslets 320 need not be refractive (e.g., diffractive, holographic, etc.). Also, in other embodiments, the lenslets 320 need not be implemented as "bumps" but could rather take any shape that has the light-bending properties so as to collimate incoming light beams that are emitted from the fiber. As shown in FIG. 3 with respected to collimated beam groups 330-350, beams emitted from the fiber at different fiber tip positions of the locus 305 enter into various lenslets 320 of the array 315 and then become substantially parallel (or collimated) with other beams that are propagated via the same lenslet.

In FIG. 3, the curved surface 310 has a center (or system) optical axis 355, and each lenslet 320 also has a lenslet optical axis 360. The field of view (FOV) of the optical element 300 refers to the degree range that light emitted from the fiber can deviate from the system optical axis 355.

As evidenced by the collimated beam groups 330-350, at any given moment in time, the rotating/vibrating fiber is pointed at a specific lenslet (or several adjacent lenslets depending on direction). The collimated beam groups 330-350 represent five snapshots of beams emitted by the optical element 300 as the fiber is oscillated along the locus 305. Thus, the direction of light emitted from the fiber at any given moment in time is always aligned or nearly aligned with the optical axis of one of the lenslets 320. When the angle of the fiber is small, aberrations (due to bending of the fiber) are correspondingly small and a degree of collimation provided by a lenslet is acceptable. This is even true when the fiber points at large angles away from the axis of symmetry of the system; i.e. large emitted field angles.

The optical performance of the optical element 300 is dependent upon the direction of the fiber and the individual lenslet (or adjacent lenslets) at which the fiber is pointed. Even at large angles with respect to the lidar system's axis of symmetry, the fiber direction and the resulting emitted light beam will be directed along or nearly along some lenslet's optical axis. Optical aberrations are reduced when light propagates in or near the direction of the optical axis of a lenslet. Thus, the optical element 300 obtains satisfactory optical performance even at large angles (e.g., 30 degrees, 60 degrees, etc.) relative the overall system axis of symmetry or at large emitted field angles.

Figure 4:
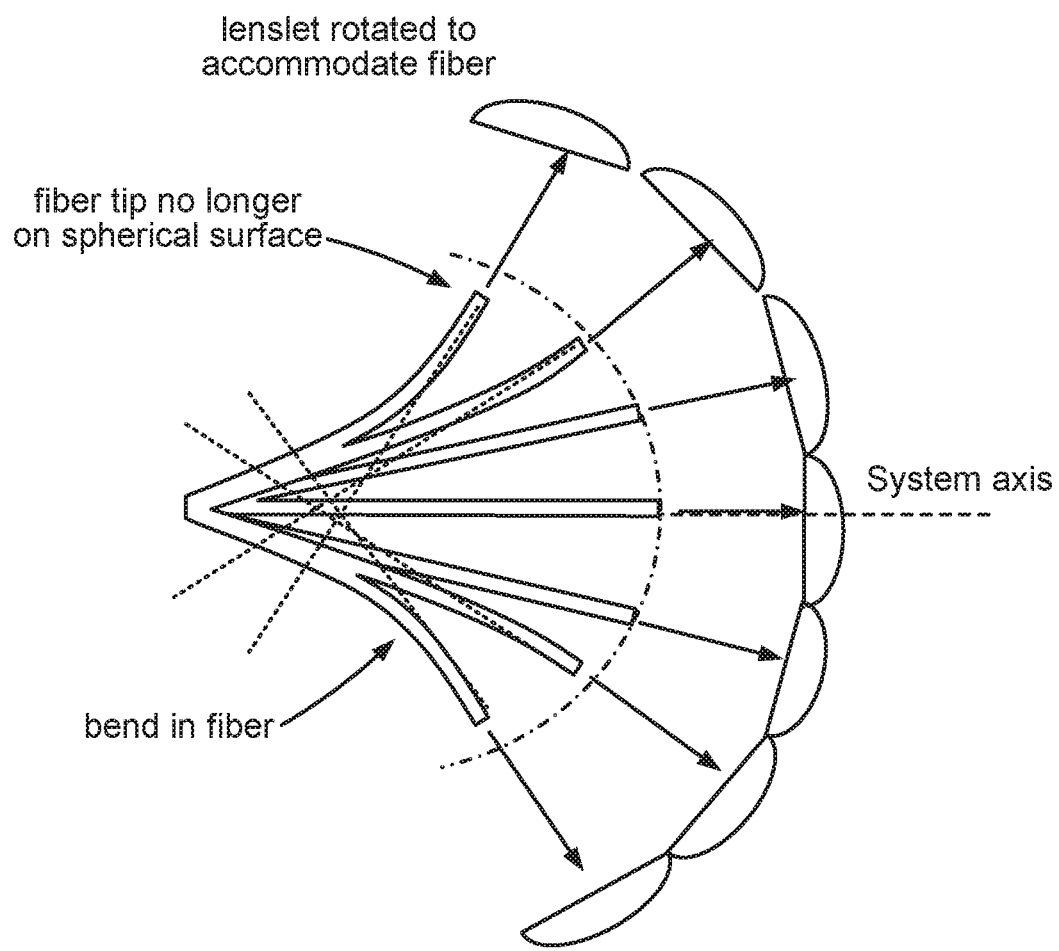
FIG. 4 illustrates a lenslet arrangement in accordance with an embodiment of the disclosure.

Furthermore, the fiber tip emission acts as a point source traveling on an arc. Since the lenslets 320 also lie on a curved surface (i.e., the curved surface 310), the distance from the fiber tip to each lenslet 320 remains substantially constant. If the fiber tip motion does not map out a spherical surface (which is common due to bending of the fiber), the lenslets 320 can be configured to accommodate the fibertip's motion (position and direction of emitted light), as shown in FIG. 4. In FIG. 4, the individual lenslets 320 are arranged so as to collimate emitted light beams in accordance with an expected bend of the fiber during oscillation. Again lenslet collimation at large field angles is preserved.

Figure 5:
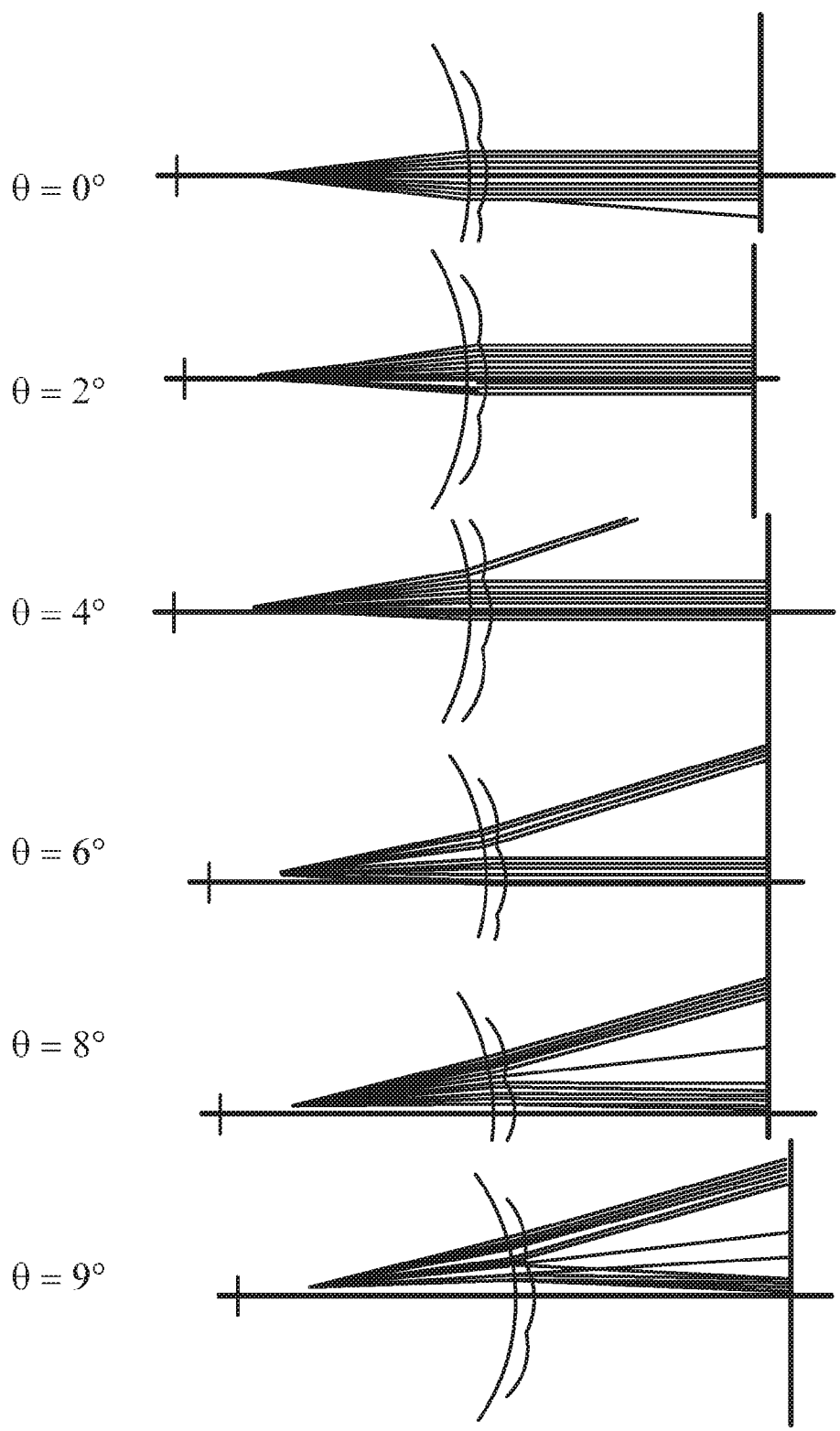
FIG. 5 a modeling of lenslet gaps impacting light collimation in accordance with an embodiment of the disclosure.

However, one drawback to the use of the lenslets depicted in FIGS. 3-4 relates to the presence of "gaps" in the emission pattern (even though emitted light is collimated). These gaps (which may be referred to as lenslet gaps) occur in proximity to the transition point between adjacent lenslets. Such gaps can be 5-10 degrees wide. FIG. 5 shows the origin of such gaps when the incident light beam "straddles" adjacent lenslets.

In an embodiment, the lenslets 320 of the optical element 300 can be arranged specifically to reduce these gaps. In particular, the locus 305 can be modeled based on the bending that occurs in the fiber at different angles of oscillation. The curvature (or shape) of the individual lenslets on the curved surface 310 can then be constructed so as to conform to the modeling of the locus 305. In particular, the curvature of the lenslets positioned at higher field angles (i.e., further away from the system optical axis) can be manipulated so as to accommodate the bending of the fiber at these higher field angles, which functions to reduce the presence of gaps in the emission pattern. A trade-off is increasing on-axis beam divergence. This is done primarily by decreasing the lenslet radius of curvature. The lenslets can also be designed with aspherical surfaces. The customization of lenslet curvature based on fiber tip locus modeling can be used in conjunction with any of the embodiments described below as an additional gap-reduction optimization.

In an alternative embodiment, the curvature of the curved surface 310 itself can also be constructed so as to conform to the modeling of the locus 305. In this alternative embodiment, the lenslets 320 need not be modified to conform to the locus 305. However, it is possible that both the lenslets 320 and the curved surface 310 can be configured (or shaped) so as to conform to the locus 305 to further reduce the gaps between the lenslets.

Figure 6:
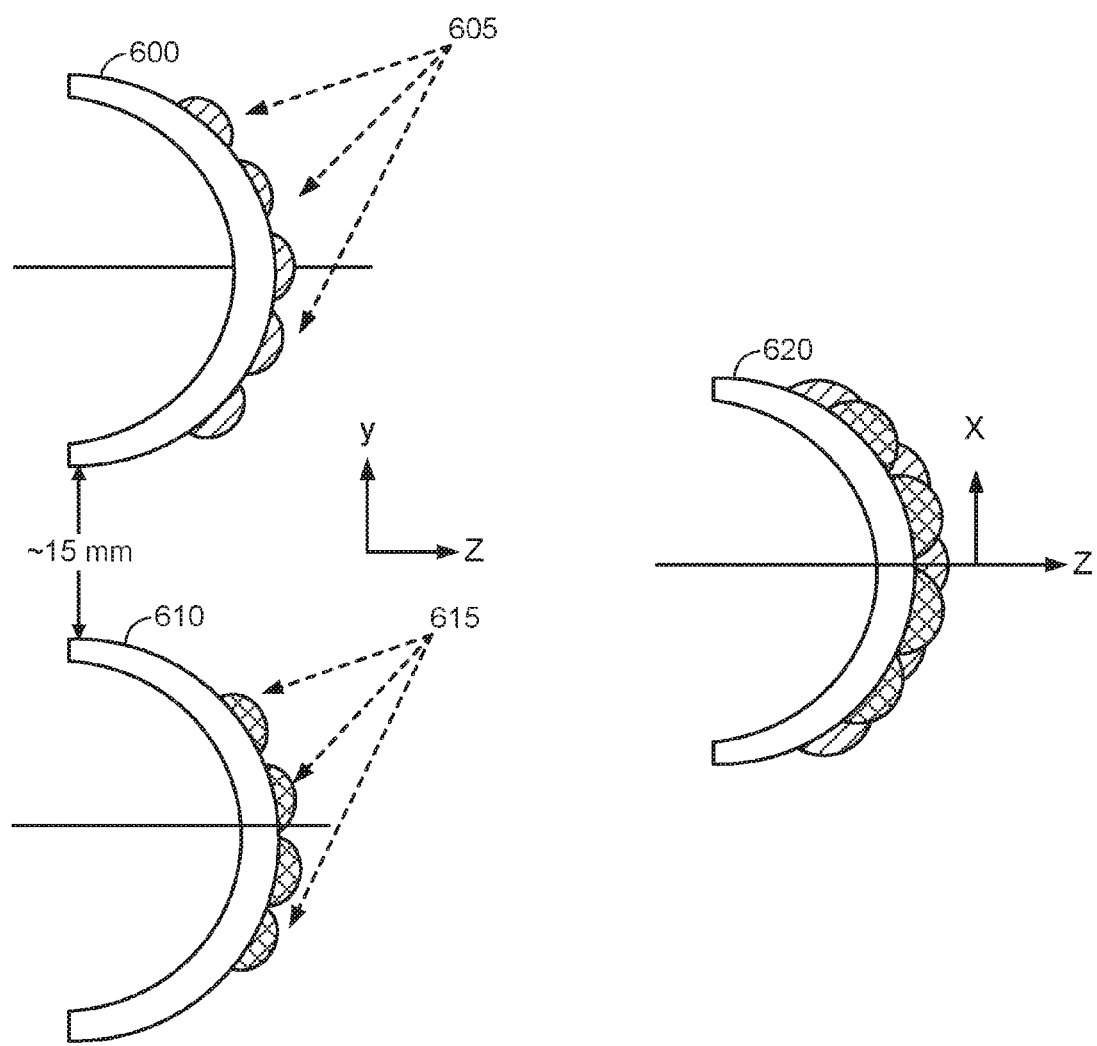
FIG. 6 illustrates a dual optical element arrangement in accordance with an embodiment of the disclosure.

FIG. 6 illustrates a dual optical element arrangement in accordance with an embodiment of the disclosure. Referring to FIG. 6, two separate optical elements 600 and 610 are deployed within the same scanning device with a given spacing between each other (e.g., between 10 and 30 mm). Each of the optical elements 600 and 610 can be configured similar to the optical element 300 described above with respect to FIG. 3. However, each of the optical elements 600 and 610 is configured with a different arrangement of lenslets within its respective arrays 605 and 615 (e.g., with hemispherically and/or aspherically-shaped lenslets, etc.). The different lenslet arrangements of optical elements 600 and 610 can be configured so that the "gaps" in the emission patterns of the respective arrays 605 and 615 do not overlap with each other by staggering the positions of the lenslets.

While not shown in FIG. 6, the two optical elements 600 and 610 can be used in conjunction with a single receiver unit to detect any light scattered from a target object in response to the emission of dual scanning optical probe beams from the respective optical elements 600 and 610. Further, the transmission of the dual scanning optical probe beams can be synchronized so that, from the perspective of the receiver unit, the light scattered from the dual scanning optical probe beams is comparable to that of a single optical element that transmitted without any gaps. Accordingly, the lenslet arrangement depicted at 620 is the "effective" lenslet coverage that is obtained by virtue of deploying the dual optical elements 600 and 610, with the effective lenslets coverage eliminating any gaps that were present in the respective arrays 605 and 615 individually. In other words, the gaps in each optical element are canceled out by the lenslet that is positioned in the corresponding positions of the other optical element. While FIG. 6 illustrates a dual optical element arrangement, it will be appreciated that any number of optical elements can be arranged in a similar manner (e.g., 3, 4, 5, etc.).

Figure 7:
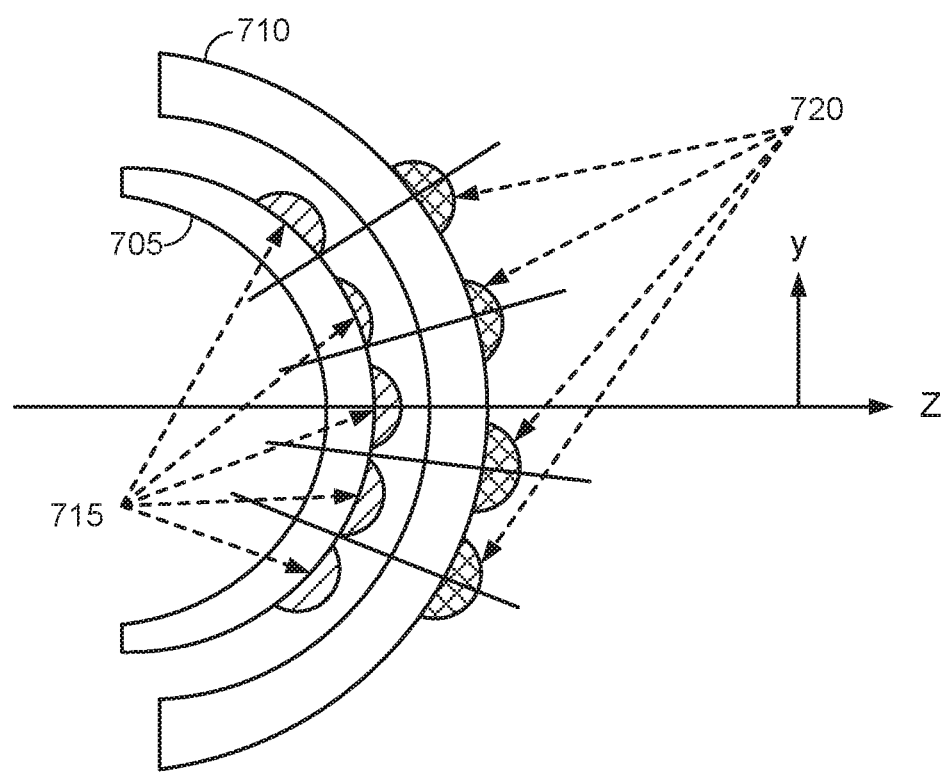
FIG. 7 illustrates an optical element arrangement in accordance with an embodiment of the disclosure.

FIG. 7 illustrates an optical element arrangement 700 in accordance with an embodiment of the disclosure. In contrast to FIG. 6 where two independent optical elements are deployed for emission of two independent scanning optical probe beams, FIG. 7 depicts a single optical element that includes two independent curved surfaces 705 and 710 that include different arrangements of lenslets within respective arrays 715 and 720. The curved surfaces 705 and 710 are arranged concentrically, with the curved surface 705 being an inner curved surface of the optical element arrangement 700 and the curved surface 710 being an outer curved surface of the optical element arrangement 700. Similar to the arrays 605 and 615 of FIG. 6, the arrays 715 and 720 deployed on the curved surfaces 705 and 710 can be arranged so that the "gaps" in the emission patterns of the respective arrays do not overlap with each other by staggering the positions of the lenslets.

Figure 1:
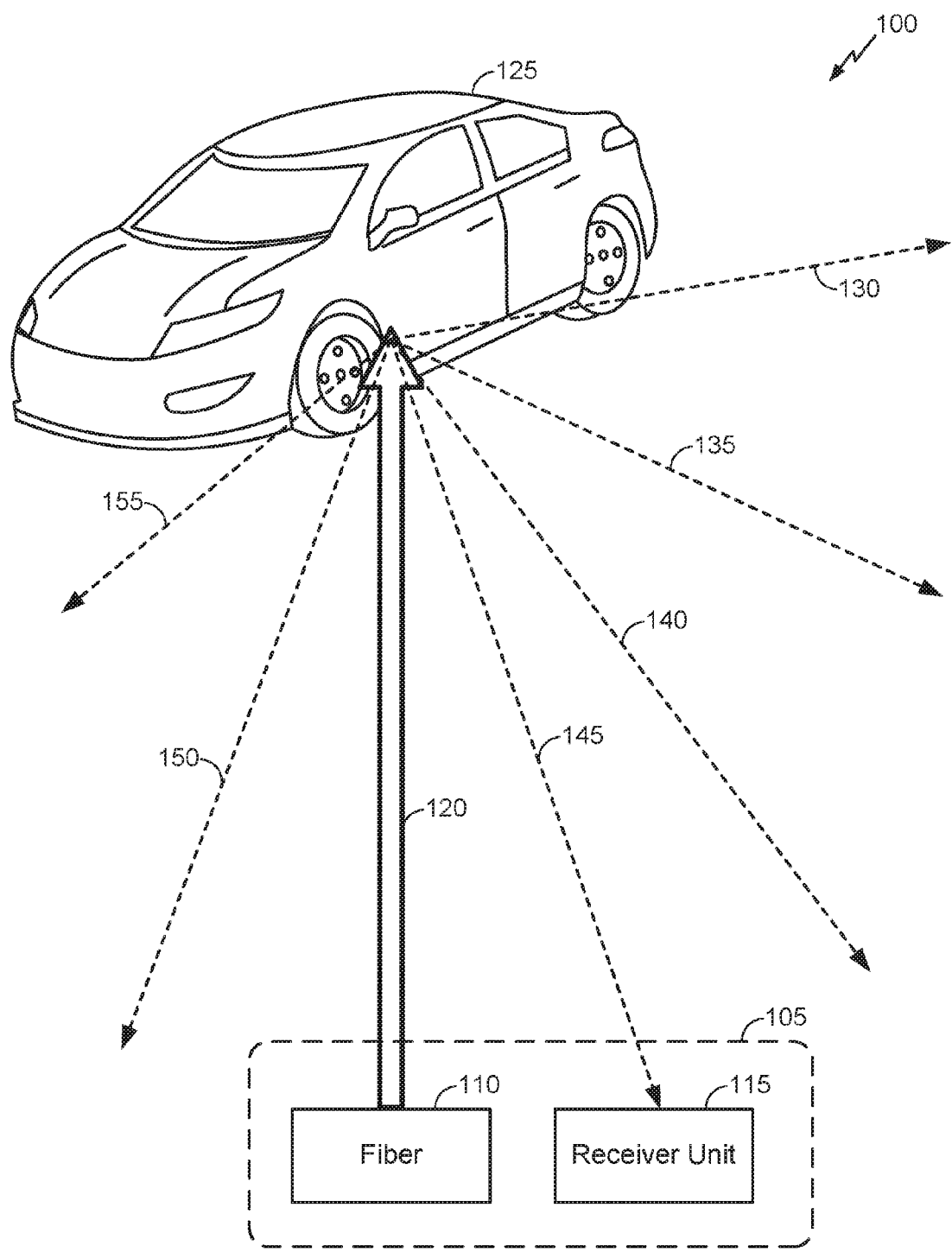
FIG. 1 illustrates an example of an object detection system.

As will be appreciated, the optical elements described above can be deployed in a scanning device for any object detection system, such as the object detection system 100 described above with respect to FIG. 1.

Figure 8:
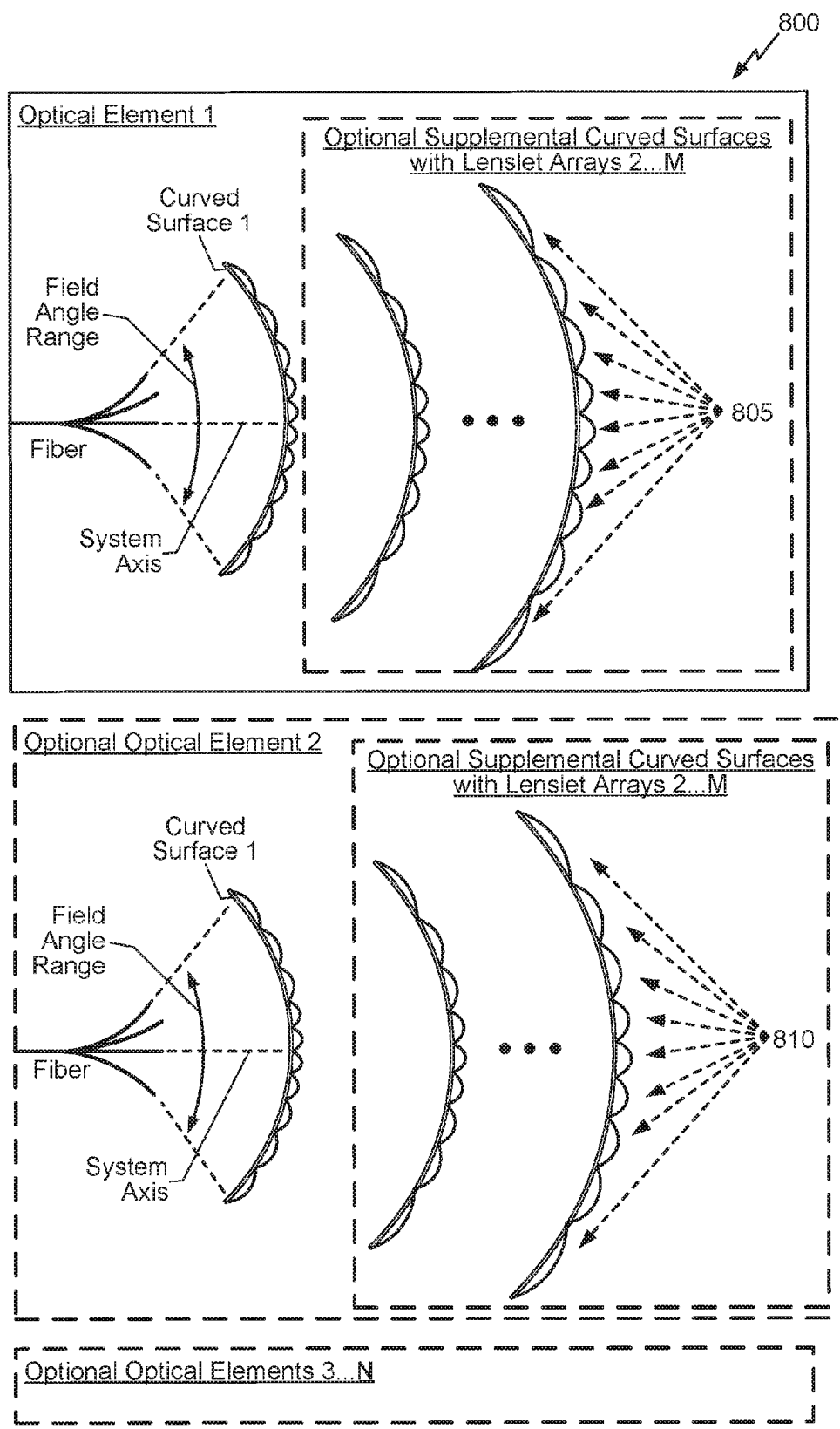
FIG. 8 illustrates an optical element arrangement 800 in accordance with an embodiment of the disclosure.

FIG. 8 illustrates an optical element arrangement 800 in accordance with an embodiment of the disclosure. The optical arrangement 800 incorporates certain aspects from the embodiments described above with respect to FIGS. 3-7.

Referring to FIG. 8, the optical element arrangement 800 includes optical elements 1 . . . N, whereby optical elements 2 . . . N are optional. Each of optical elements 1 . . . N includes a fiber configured for oscillation at different angular positions relative to a respective system axis over a target field angle range, curved surfaces 1 . . . M, with each curved surface being equipped with a lenslet array, whereby curved surfaces 2 . . . M are optional. In FIG. 8, the lenslet array on curved surface M for optical element 1 is labeled as 805 and the lenslet array on curved surface M for optical element 2 is labeled as 810. While the other lenslet arrays in FIG. 8 are not expressly labeled for the sake of visual clarity, the implementation of these other lenslet arrays will be appreciated by one of ordinary skill in the art in context.

Referring to FIG. 8, if N=1 and M=1 such that the optical arrangement 800 includes optical element 1 with curved surface 1 only, the optical element arrangement 800 corresponds to the optical element 300 described above with respect to FIG. 3. If N>1 and M=1 such that the optical arrangement 800 includes multiple optical elements that each have a single curved surface and lenslet array, the optical element arrangement 800 corresponds to the optical element arrangement 600 described above with respect to FIG. 6. If N=1 and M>1 such that the optical arrangement 800 includes optical element 1 with multiple curved surfaces and lenslet arrays, the optical element arrangement 800 corresponds to the optical element arrangement 700 described above with respect to FIG. 7.

In other permutations of FIG. 8, the value of M can be different for different optical elements (e.g., some optical elements among optical elements 1 . . . N may have multiple curved surfaces and lenslet arrays while other optical elements have a single curved surface and lenslet array, etc.). Moreover, the internal structure of the optional optical elements 3 . . . N is omitted for convenience of explanation, although it is understood that, if implemented, the optional optical elements 3 . . . N may be configured similarly to optional optical elements 1 and/or 2 (e.g., with one or more curved surfaces including one or more lenslet arrays).

Figure 9:
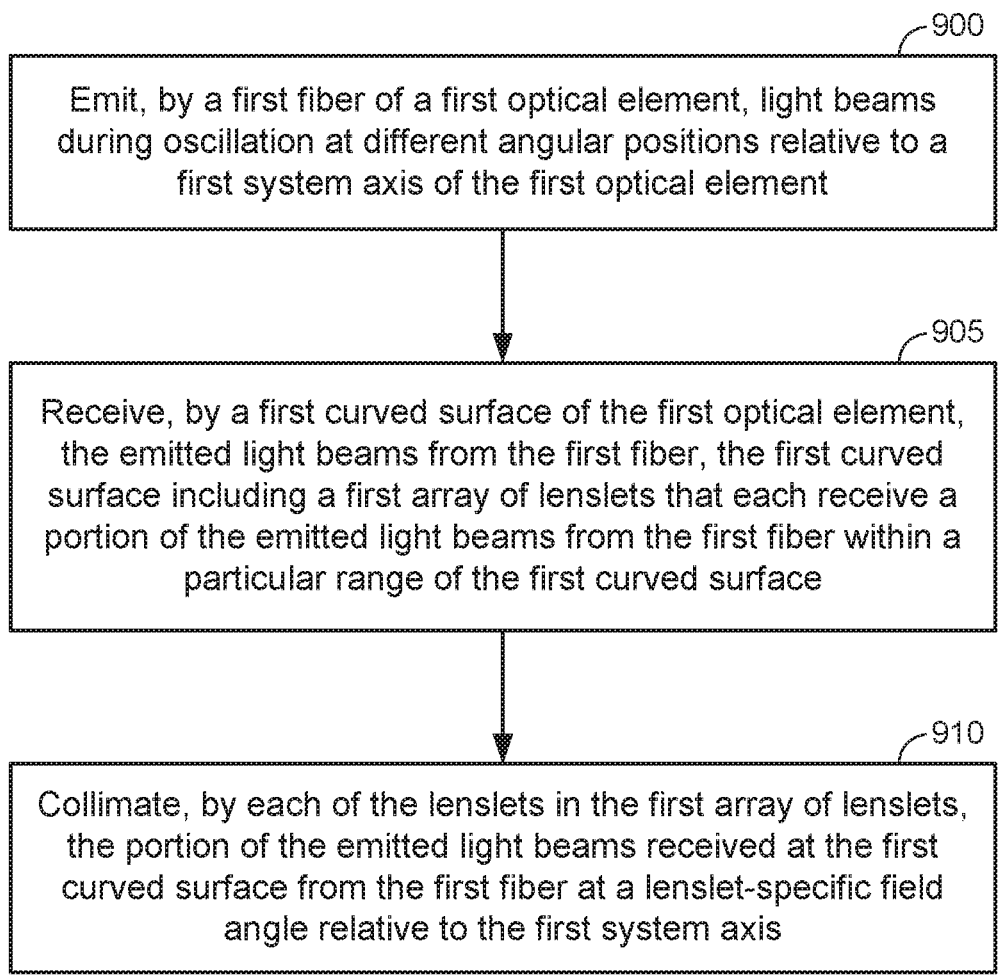
FIG. 9 illustrates a process of collimating light emitted by an optical element arrangement in accordance with an embodiment of the disclosure.

FIG. 9 illustrates a process of collimating light emitted by an optical element arrangement in accordance with an embodiment of the disclosure. The process of FIG. 9 may be implemented by any of the embodiments described above with respect to FIGS. 3-8 (e.g., a single optical element with a single curved surface with lenslet array, a dual optical element each equipped with a single curved surface with lenslet array, a single optical element with multiple curved surfaces each including a lenslet array, etc.).

Referring to FIG. 9, the optical element arrangement emits by a first fiber of a first optical element, light beams during oscillation at different angular positions relative to a first system axis of the first optical element, 900. The optical element arrangement receives, by a first curved surface of the first optical element, the emitted light beams from the first fiber, the first curved surface including a first array of lenslets that each receive a portion of the emitted light beams from the first fiber within a particular range of the first curved surface, 905. The optical element arrangement collimates, by each of the lenslets in the first array of lenslets, the portion of the emitted light beams received at the first curved surface from the first fiber at a lenslet-specific field angle relative to the first system axis, 910.

Referring to FIG. 9, as noted above with respect to FIGS. 3-8, in an example, each of the lenslets in the first array of lenslets may be shaped hemispherically or aspherically. In a further example, a shape of the first curved surface may be configured to conform to a modeled locus of fiber tip positions of the first fiber as the first fiber bends during oscillation. In a further example, one or more lenslets within the first array of lenslets may be configured to conform to a modeled locus of fiber tip positions of the first fiber as the first fiber bends during oscillation.

Figure 10:
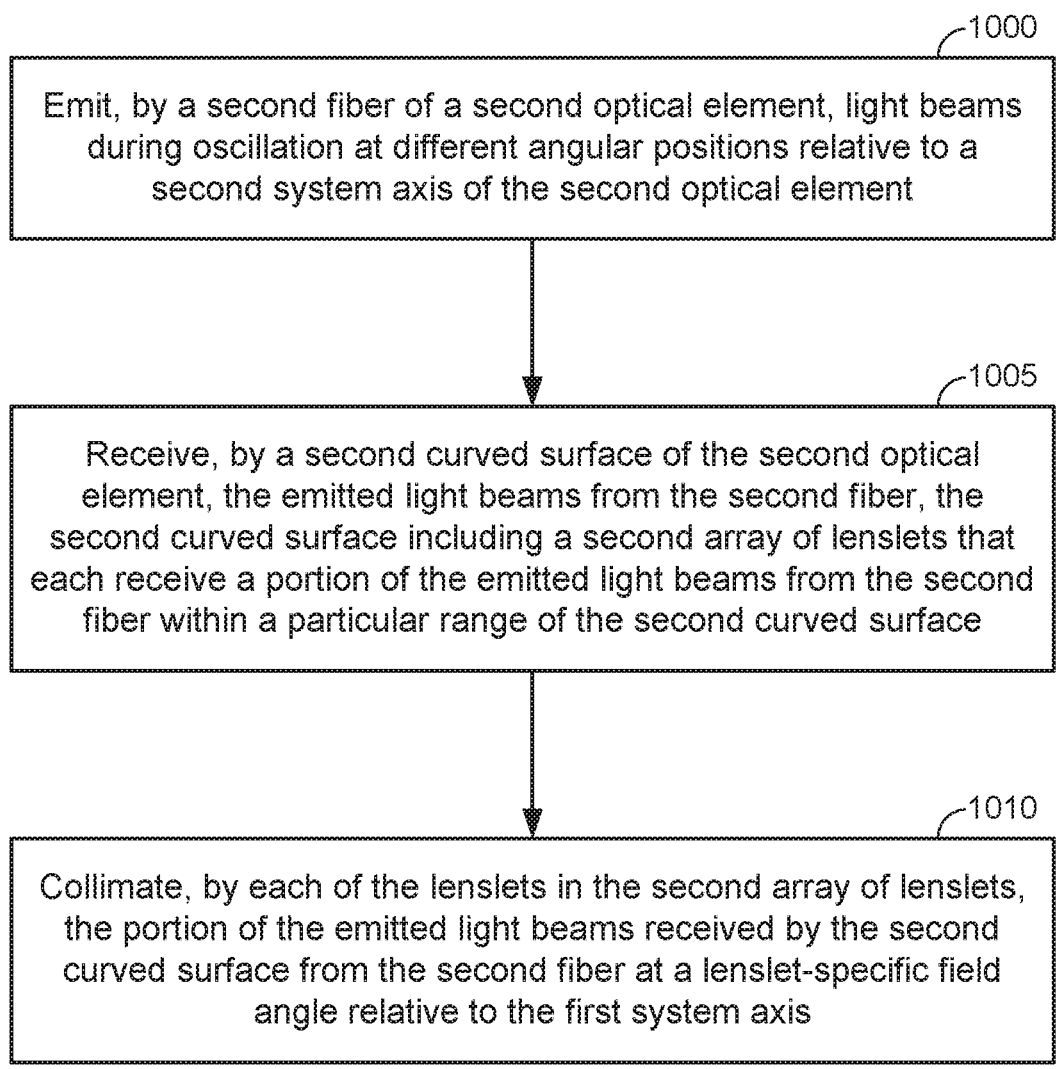
FIG. 10 illustrates a supplemental process that executes in parallel with the process of FIG. 9 in accordance with an embodiment of the disclosure.

FIG. 10 illustrates a supplemental process that executes in parallel with the process of FIG. 9 in accordance with an embodiment of the disclosure. Referring to FIG. 10, the optical element arrangement emits by a second fiber of a second optical element, light beams during oscillation at different angular positions relative to a second system axis of the second optical element, 1000. The optical element arrangement receives, by a second curved surface of the second optical element, the emitted light beams from the second fiber, the second curved surface including a second array of lenslets that each receive a portion of the emitted light beams from the second fiber within a particular range of the second curved surface, 1005. The optical element arrangement collimates, by each of the lenslets in the second array of lenslets, the portion of the emitted light beams received by the second curved surface from the second fiber at a lenslet-specific field angle relative to the first system axis, 1010. Referring to FIGS. 9-10, 1000-1010 of FIG. 10 represent an optional parallel process that may occur synchronously with the 900-910 of FIG. 9.

Referring to FIGS. 9 and 10, as noted above with respect to FIGS. 6 and 8, in an example, the first and second optical elements may be proximately located and oriented in the same direction, and the first and second optical elements may be configured for synchronous light beam transmission. Moreover, in a further example, the first array of lenslets may include a first set of lenslet gaps corresponding to transitions between respective lenslets on the first curved surface, the second array of lenslets may include a second set of lenslet gaps corresponding to transitions between respective lenslets on the second curved surface, and the first and second arrays of lenslets may be arranged so that the first and second sets of lenslet gaps do not overlap with each other angularly with respect to the first and second system axes, respectively, so that continuous collimation coverage is provided by the first and second optical elements over a target field angle range relative to the first and second system axes.

Figure 11:
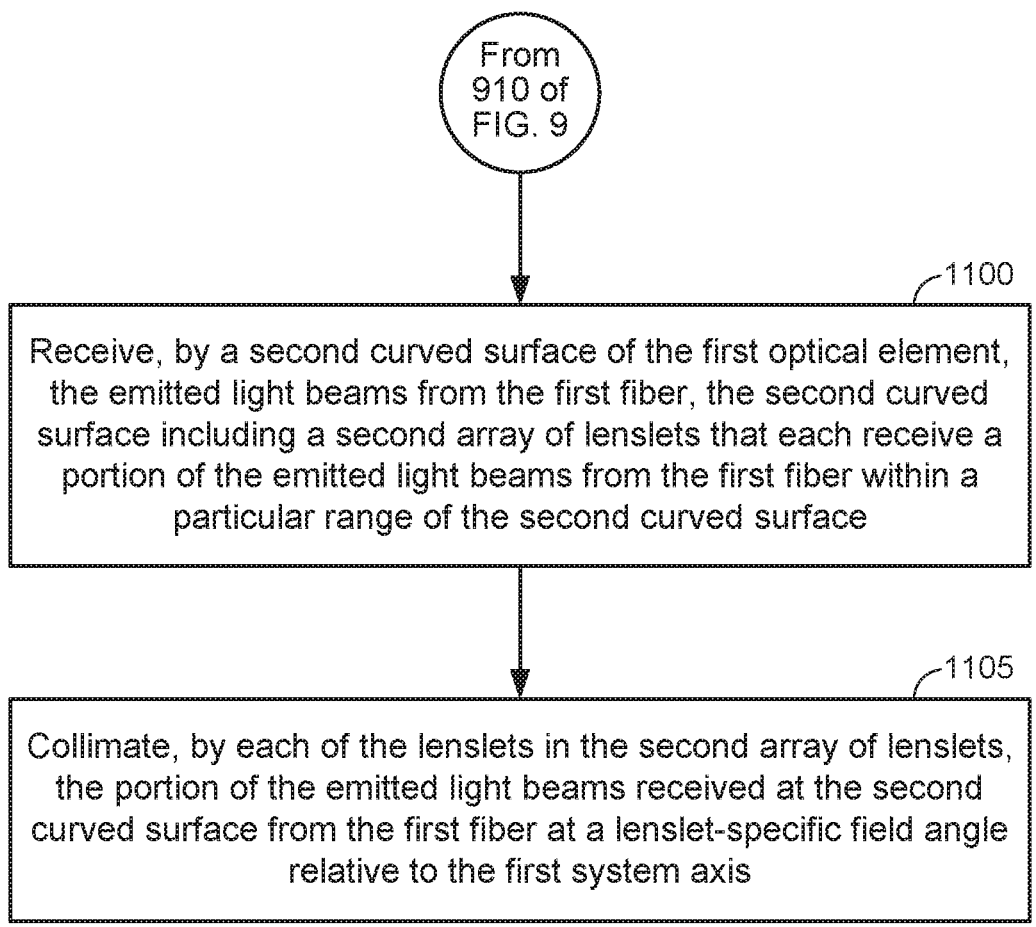
FIG. 11 illustrates another supplemental process that executes in parallel with the process of FIG. 9 in accordance with an embodiment of the disclosure.

FIG. 11 illustrates another supplemental process that executes in parallel with the process of FIG. 9 in accordance with an embodiment of the disclosure. Referring to FIG. 11, the optical element arrangement receives, by a second curved surface of the first optical element, the emitted light beams from the first fiber, the second curved surface including a second array of lenslets that each receive a portion of the emitted light beams from the first fiber within a particular range of the second curved surface, 1100. The optical element arrangement collimates by each of the lenslets in the second array of lenslets, the portion of the emitted light beams received at the second curved surface from the first fiber at a lenslet-specific field angle relative to the first system axis, 1105.

Referring to FIGS. 9 and 11, as noted above with respect to FIGS. 7 and 8, in an example relative to the first fiber, the first curved surface may correspond to an inner curved surface and the second curved surface may correspond to an outer curved surface. Alternatively, relative to the first fiber, the first curved surface may correspond to the outer curved surface and the second curved surface may correspond to the inner curved surface. In a further example, the first array of lenslets may include a first set of lenslet gaps corresponding to transitions between respective lenslets on the first curved surface, the second array of lenslets may include a second set of lenslet gaps corresponding to transitions between respective lenslets on the second curved surface, and the first and second arrays of lenslets may be arranged so that the first and second sets of lenslet gaps do not overlap with each other angularly with respect to the first system axis, so that continuous collimation coverage is provided by the first optical element over a target field angle range relative to the first system axis.

Referring to FIGS. 9 and 11, 1100-1105 of FIG. 11 represent an optional parallel process that may occur synchronously with the 905-910 of FIG. 9. Moreover, the optional parallel processes depicted in FIGS. 10-11 may be deployed with the process of FIG. 9 in various combinations in accordance with embodiments of the disclosure. For example, consider a scenario where the optical element arrangement includes three optical elements, two of which have a pair of curved surfaces with lenslet arrays and another that has a single curved surface with a single lenslet array. In this scenario, the process of FIG. 9 executes at each of the three optical elements, the process of FIG. 10 executes twice (for each additional optical element after an initial optical element) and the process of FIG. 11 executes at each of the two optical elements with the pair of curved surfaces.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. An optical element arrangement, comprising:
   a first optical element, including:
     a first fiber configured to emit light beams during oscillation at different angular positions relative to a first system axis of the first optical element; and
     a first curved surface including a first array of lenslets, each of the lenslets in the first array of lenslets configured to receive light beams from the first fiber that are emitted within a particular range of the first curved surface and to collimate the light beams received by the lenslet at a lenslet-specific field angle relative to the first system axis.

2. The optical element arrangement of claim 1, further comprising:
   a second optical element, including:
     a second fiber configured to emit light beams during oscillation at different angular positions relative to a second system axis of the second optical element; and
     a second curved surface including a second array of lenslets, each of the lenslets in the second array of lenslets configured to receive light beams from the second fiber that are emitted within a particular range of the second curved surface and to collimate the light beams received by the lenslet at a lenslet-specific field angle relative to the second system axis.

3. The optical element arrangement of claim 2,
   wherein the first and second optical elements are proximately located and oriented in the same direction, and
   wherein the first and second optical elements are configured for synchronous light beam transmission.

4. The optical element arrangement of claim 2,
   wherein the first array of lenslets includes a first set of lenslet gaps corresponding to transitions between respective lenslets on the first curved surface,
   wherein the second array of lenslets includes a second set of lenslet gaps corresponding to transitions between respective lenslets on the second curved surface, and
   wherein the first and second arrays of lenslets are arranged so that the first and second sets of lenslet gaps do not overlap with each other angularly with respect to the first and second system axes, respectively, so that continuous collimation coverage is provided by the first and second optical elements over a target field angle range relative to the first and second system axes.

5. The optical element arrangement of claim 1, wherein the first optical element further includes:
   a second curved surface including a second array of lenslets, each of the lenslets in the second array of lenslets configured to receive light beams from the first fiber that are emitted within a particular range of the second curved surface and to collimate the light beams received by the lenslet at a lenslet-specific field angle relative to the first system axis.

6. The optical element arrangement of claim 5,
   wherein, relative to the first fiber, the first curved surface corresponds to an inner curved surface and the second curved surface corresponds to an outer curved surface, or
   wherein, relative to the first fiber, the first curved surface corresponds to the outer curved surface and the second curved surface corresponds to the inner curved surface.

7. The optical element arrangement of claim 5,
   wherein the first array of lenslets includes a first set of lenslet gaps corresponding to transitions between respective lenslets on the first curved surface,
   wherein the second array of lenslets includes a second set of lenslet gaps corresponding to transitions between respective lenslets on the second curved surface, and
   wherein the first and second arrays of lenslets are arranged so that the first and second sets of lenslet gaps do not overlap with each other angularly with respect to the first system axis, so that continuous collimation coverage is provided by the first optical element over a target field angle range relative to the first system axis.

8. The optical element arrangement of claim 1, wherein each of the lenslets in the first array of lenslets is shaped hemispherically or aspherically.

9. The optical element arrangement of claim 1, wherein a shape of the first curved surface is configured to conform to a modeled locus of fiber tip positions of the first fiber as the first fiber bends during oscillation.

10. The optical element arrangement of claim 1, wherein one or more lenslets within the first array of lenslets are configured to conform to a modeled locus of fiber tip positions of the first fiber as the first fiber bends during oscillation.

11. A method of operating an optical element arrangement, comprising:
    emitting, by a first fiber of a first optical element, light beams during oscillation at different angular positions relative to a first system axis of the first optical element;
    receiving, by a first curved surface of the first optical element, the emitted light beams from the first fiber, the first curved surface including a first array of lenslets that each receive a portion of the emitted light beams from the first fiber within a particular range of the first curved surface; and
    collimating, by each of the lenslets in the first array of lenslets, the portion of the emitted light beams received at the first curved surface from the first fiber at a lenslet-specific field angle relative to the first system axis.

12. The method of claim 11, further comprising:
    emitting, by a second fiber of a second optical element, light beams during oscillation at different angular positions relative to a second system axis of the second optical element; and receiving, by a second curved surface of the second optical element, the emitted light beams from the second fiber, the second curved surface including a second array of lenslets that each receive a portion of the emitted light beams from the second fiber within a particular range of the second curved surface; and collimating, by each of the lenslets in the second array of lenslets, the portion of the emitted light beams received by the second curved surface from the second fiber at a lenslet-specific field angle relative to the first system axis.

13. The method of claim 12,
wherein the first and second optical elements are proximately located and oriented in the same direction, and
wherein the first and second optical elements are configured for synchronous light beam transmission.

14. The method of claim 12,
wherein the first array of lenslets includes a first set of lenslet gaps corresponding to transitions between respective lenslets on the first curved surface,
wherein the second array of lenslets includes a second set of lenslet gaps corresponding to transitions between respective lenslets on the second curved surface, and
wherein the first and second arrays of lenslets are arranged so that the first and second sets of lenslet gaps do not overlap with each other angularly with respect to the first and second system axes, respectively, so that continuous collimation coverage is provided by the first and second optical elements over a target field angle range relative to the first and second system axes.

15. The method of claim 11, further comprising:
receiving, by a second curved surface of the first optical element, the emitted light beams from the first fiber, the second curved surface including a second array of lenslets that each receive a portion of the emitted light beams from the first fiber within a particular range of the second curved surface; and
collimating, by each of the lenslets in the second array of lenslets, the portion of the emitted light beams received at the second curved surface from the first fiber at a lenslet-specific field angle relative to the first system axis.

16. The method of claim 15,
wherein, relative to the first fiber, the first curved surface corresponds to an inner curved surface and the second curved surface corresponds to an outer curved surface, or
wherein, relative to the first fiber, the first curved surface corresponds to the outer curved surface and the second curved surface corresponds to the inner curved surface.

17. The method of claim 15,
wherein the first array of lenslets includes a first set of lenslet gaps corresponding to transitions between respective lenslets on the first curved surface,
wherein the second array of lenslets includes a second set of lenslet gaps corresponding to transitions between respective lenslets on the second curved surface, and
wherein the first and second arrays of lenslets are arranged so that the first and second sets of lenslet gaps do not overlap with each other angularly with respect to the first system axis, so that continuous collimation coverage is provided by the first optical element over a target field angle range relative to the first system axis.

18. The method of claim 11, wherein each of the lenslets in the first array of lenslets is shaped hemispherically or aspherically.

19. The method of claim 11, wherein a shape of the first curved surface is configured to conform to a modeled locus of fiber tip positions of the first fiber as the first fiber bends during oscillation.

20. The method of claim 11, wherein one or more lenslets within the first array of lenslets are configured to conform to a modeled locus of fiber tip positions of the first fiber as the first fiber bends during oscillation.

21. An optical element arrangement, comprising:
a first optical element, including:
a first means for emitting light beams during oscillation at different angular positions relative to a first system axis of the first optical element; and
a first means for receiving light beams from the first means for emitting that are emitted within a first set of ranges of the first means for receiving, the first means for receiving including a first array of means for collimating the light beams received by the first means for receiving, each of the first array of means for collimating configured to collimate the light beams within a particular range from the first set of ranges at a field angle relative to the first system axis that is specific to the means for collimating.

22. The optical element arrangement of claim 21, further comprising:
a second optical element, including:
a second means for emitting light beams during oscillation at different angular positions relative to a second system axis of the second optical element; and
a second means for receiving light beams from the second means for emitting that are emitted within a second set of ranges of the second means for receiving, the second means for receiving including a second array of means for collimating the light beams received by the second means for receiving, each of the second array of means for collimating configured to collimate the light beams within a particular range from the second set of ranges at a field angle relative to the second system axis that is specific to the means for collimating.

23. The optical element arrangement of claim 22,
wherein the first and second optical elements are proximately located and oriented in the same direction, and
wherein the first and second optical elements are configured for synchronous light beam transmission.

24. The optical element arrangement of claim 22,
wherein the first array of means for collimating includes a first set of gaps corresponding to transitions between respective means for collimating on the first means for receiving,
wherein the second array of means for collimating includes a second set of gaps corresponding to transitions between respective means for collimating on the second means for receiving, and
wherein the first array of means for collimating and the second array of means for collimating are arranged so that the first and second sets of gaps do not overlap with each other angularly with respect to the first and second system axes, respectively, so that continuous collimation coverage is provided by the first and second optical elements over a target field angle range relative to the first and second system axes.

25. The optical element arrangement of claim 21, wherein the first optical element further includes:
a second means for receiving light beams from the first means for emitting that are emitted within a second set of ranges of the second means for receiving, the second means for receiving including a second array of means for collimating the light beams received by the second means for receiving, each of the second array of means for collimating configured to collimate the light beams within a particular range from the second set of ranges at a field angle relative to the first system axis that is specific to the means for collimating.

26. The optical element arrangement of claim 25,
wherein, relative to the first means for emitting, the first means for receiving corresponds to an inner means for receiving and the second means for receiving corresponds to an outer means for receiving, or
wherein, relative to the first means for emitting, the first means for receiving corresponds to the outer means for receiving and the second means for receiving corresponds to the inner means for receiving.

27. The optical element arrangement of claim 25,
wherein the first array of means for collimating includes a first set of gaps corresponding to transitions between respective means for collimating on the first means for receiving,
wherein the second array of means for collimating includes a second set of gaps corresponding to transitions between respective means for collimating on the second means for receiving, and
wherein the first and second arrays of means for collimating are arranged so that the first and second sets of gaps do not overlap with each other angularly with respect to the first system axis, so that continuous collimation coverage is provided by the first optical element over a target field angle range relative to the first system axis.

28. The optical element arrangement of claim 21, wherein each of the means for collimating in the first array of means for collimating is shaped hemispherically or aspherically.

29. The optical element arrangement of claim 21, wherein a shape of the first means for receiving is configured to conform to a modeled locus of positions of the first means for emitting as the first means for emitting bends during oscillation.

30. The optical element arrangement of claim 21, wherein one or more means for collimating within the first array of means for collimating are configured to conform to a modeled locus of positions of the first means for emitting as the first means for emitting bends during oscillation.

* * * * *